April 2, 1963   N. M. BARLOW ETAL   3,083,429
SNAP FASTENER MEMBERS IN STRIP FORM
Original Filed Oct. 21, 1958   2 Sheets-Sheet 1

INVENTORS:
NORMAN M. BARLOW,
EVERETT MELANSON,
BY Walter S. Jones
ATTORNEY

April 2, 1963  N. M. BARLOW ETAL  3,083,429
SNAP FASTENER MEMBERS IN STRIP FORM
Original Filed Oct. 21, 1958
2 Sheets-Sheet 2

INVENTORS:
NORMAN M. BARLOW,
EVERETT MELANSON,
BY Walter S. Jones
ATTORNEY.

3,083,429
SNAP FASTENER MEMBERS IN STRIP FORM

Norman M. Barlow, Natick, and Everett Melanson, Wakefield, Mass., assignors to United-Carr Fastener Corporation, Cambridge, Mass., a corporation of Delaware
Original application Oct. 21, 1958, Ser. No. 768,760, now Patent No. 3,049,462, dated Aug. 14, 1962. Divided and this application Dec. 9, 1959, Ser. No. 858,419
5 Claims. (Cl. 24—208)

The present invention relates to stud and socket fastener elements, and more particularly to new and improved stud and socket fastener elements in strip form.

This application is a division of our application Serial No. 768,760, filed October 21, 1958, now Patent No. 3,049,462.

The present invention is concerned with the problem of attaching snap fasteners previously formed from plastic, such as, for example, vinyl plastic, to various supporting articles, preferably by heat sealing methods. The present invention contributes to the solution of such problem by the provision of a strip of such snap fastener components, either in the form of a strip of stud elements or a strip of socket elements, united to one another in edge to edge contact. The strip of snap fastener components is preferably made of heat sealable plastic materials.

A principal object of the present invention is the provision of a strip of fastener elements which may be fed to a suitable fastening apparatus operable to separate the fasteners and then heat seal them to a suitable supporting material.

Another object of the present invention is the provision of snap fastener elements, preferably made of plastic, as individual units, e.g., studs and sockets, the individual stud units or socket units being then united in strip form.

The snap fastener components in strip form may be fed to a fastening or attaching apparatus where the fastener elements are separated, one or more at a time, from the strip and applied to the supporting structure. A new and simple form of such apparatus is set forth in detail in our above-mentioned copending application Serial No. 768,760, filed October 21, 1958, of which the instant application is a division.

The invention resides in the novel features and combinations hereinafter set forth, and is more particularly defined in the accompanying claims.

In the accompanying drawings of an illustrative embodiment of the invention:

Figure 1:
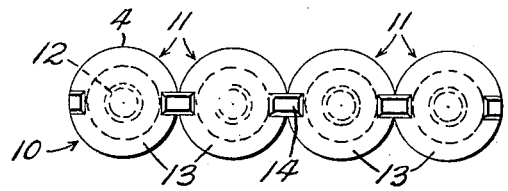
FIGURE 1 is a plan view of a portion of a strip of snap fastener studs made in accordance with the present invention as viewed from the base side.
Figure 2:
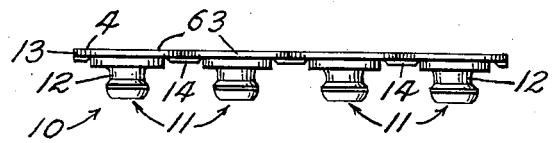
FIG. 2 is a side elevation of the strip of snap fastener studs shown in FIG. 1.

Referring now to the drawings, and with particular reference to FIGS. 1 and 2, the strip of snap fastener components, generally designated by reference numeral 10, is illustrated therein in the form of a strip of snap fastener stud elements 11. The stud elements 11 each includes a stud portion 12 having an enlarged head portion at one end, with the opposite end thereof being secured centrally to the top surface of a flange portion 13. The flange portion 13 has, as illustrated, its opposite face generally flat, forming a substantially flat undersurface which will be in heat sealing engagement with the surface of the support to which the snap fastener stud 11 is to be secured. The flange portion 13 of each of the stud elements 11 are secured together in edge to edge contact by a heat sealing operation to form the strip 10 of snap fastener stud elements 11. In the heat sealing of the flange portions 13 to one another in edge to edge relationship, a severable connecting portion 14 of a width less than the width of the flange portions 13 is formed therebetween.

Figure 3:
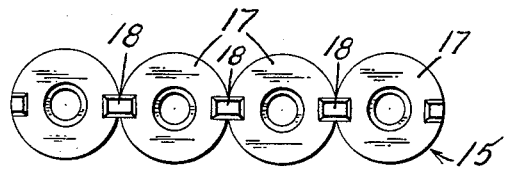
FIG. 3 is a plan view from the flange side of a portion of a strip of snap fastener socket members made in accordance with the present invention.
Figure 4:
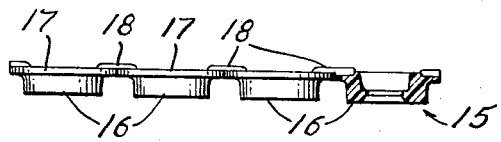
FIG. 4 is a side elevation of a fastener socket strip shown in FIG. 3, with one socket shown in section.

Referring now to FIGS. 3 and 4, the strip of snap fastener components, generally designated by reference numeral 15, illustrated therein is shown in the form of a strip of snap fastener socket elements 16. Each of the socket elements 16 includes a cavity or opening of a size sufficient to accommodate the head of a complementary snap fastener stud, with the other end of the socket elements 16 opposite the stud receiving opening being centrally connected to one face of a flange portion 17. The opposite face of the flange portion 17 is substantially flat, forming a substantially flat undersurface for sealing of the socket element 16 to the desired support. The flange portions 17 are secured to one another in edge to edge contact by a heat sealed engagement to form the continuous strip in the same manner as with respect to the snap fastener stud flange portions 13 hereinbefore described. Similarly, the heat sealing of the flange portions 17 of the socket elements 16 results in a narrow, severable connecting portion 18 of less width than the width of the flange portions 17, being formed between the flange portions of the respective socket elements 16.

Figure 5:
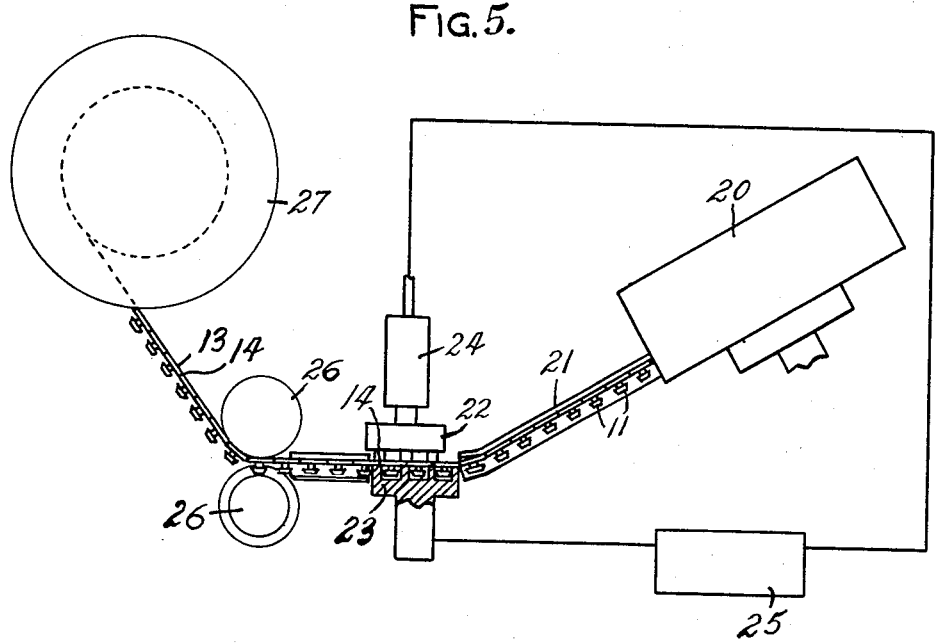
FIG. 5 is a schematic side view of apparatus that may be used in assembling the snap fastener members in strip form.
Figure 6:
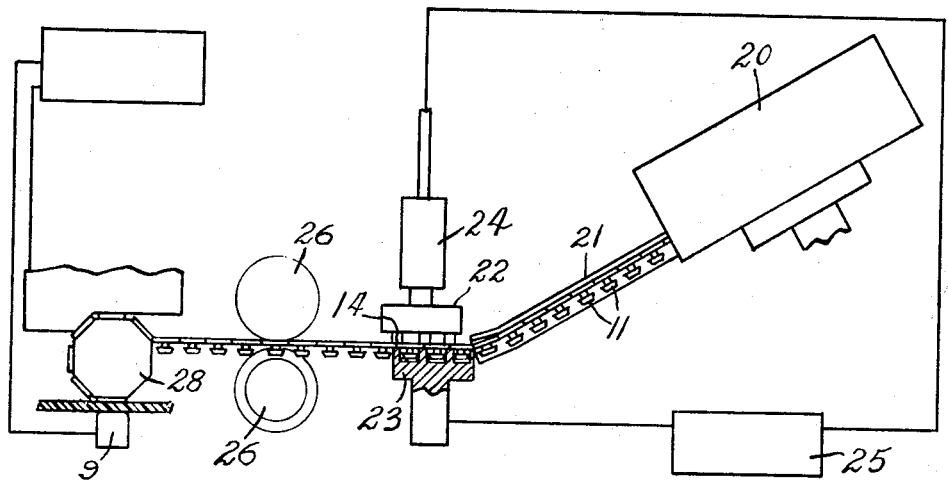
FIG. 6 is a schematic view in side elevation showing another form of apparatus that may be used for assembly of the fasteners into strip form, which thereafter may be fed directly to an apparatus for attaching the fastener elements to a supporting member.

Our improved methods of making the fastener strips and supplying the fasteners to the attaching apparatus are best shown in FIGS. 5 and 6. In the ensuing description relating to such methods, reference will be had only to the formation of a strip of fastener studs 11. However, it is to be clearly understood that such description will be equally applicable with the formation of a strip of fastener socket elements 16.

In FIG. 5, we have shown, in a schematic manner, a method which includes providing a hopper 20 into which individual snap fastener studs 11 (as shown) or socket elements 16 are placed and suitably fed down a track 21 to heat sealing electrodes 22 and 23. Any suitable means may be used to operate the electrodes for the heat sealing operation, as by an air cylinder 24 and a high frequency generator 25. As the studs 11 pass through the heat sealing electrodes, their flange portions 13 are in edge to edge contact and the electrodes are shaped to heat seal the edges together and form connections 14, as best shown in FIG. 1. Two or more stud flange portions 13 may be sealed in each operation of the electrodes, and they may be sealed as a continuing or intermittent operation, as will be understood by those skilled in the art. Thereafter the continuous strip of fastener studs 11 is fed through rollers 26 to a driven reel 27, as illustrated.

If desirable, the mechanism for feeding and heat sealing the fastener studs in edge to edge contact may be associated directly with the apparatus described in detail in our above-mentioned application Serial No. 768,760, filed October 21, 1958, with the strip of fastener studs 11 fed directly to the rotor 28 (or rotors), as shown by FIG. 6. Thus, we have provided new, useful and simple methods and mechanisms for assembling the fastener members into strips and then feeding these strips to apparatus that will separate them and attach them to suitable supporting materials, preferably by high frequency heat sealing power.

We claim:
1. A strip of snap fastener components of the class described for use in automatic snap fastener component applying and sealing equipment wherein each fastener component is individually severed and sealed automatically to an article from the continuous strip, comprising a series of snap fastener components, each of said components having a thin, heat sealable plastic flange portion having a substantially flat undersurface for heat sealing engagement with the surface of an article and a snap fastener portion extending from the opposite surface thereof, each of said components being united to another in substantially edge to edge contact by a severable heat sealed attaching portion of less width than said flange portions heat sealed to adjacent flange portions of said components.

2. A strip of plastic snap fastener components of the class described for use in automatic snap fastener component applying and sealing equipment wherein each fastener component is individually severed and sealed automatically to an article from the continuous strip, comprising a series of plastic snap fastener components, each of said components having a thin, heat sealable plastic flange portion having a substantially flat undersurface for heat sealing engagement with the surface of an article and a plastic snap fastener portion extending from the opposite surface thereof, each of said components being united to another in substantially edge to edge contact by a severable plastic heat sealed attaching portion of less width than said flange portions heat sealed to adjacent flange portions of said components.

3. A strip of snap fastener components in accordance with claim 1, wherein the snap fastener component is a snap fastener stud.

4. A strip of snap fastener components in accordance with claim 1, wherein the snap fastener component is a snap fastener socket.

5. A strip of snap fastener components of the class described for use in automatic snap fastener component applying and sealing equipment wherein each fastener component is individually severed and sealed automatically to an article from the continuous strip, comprising a series of snap fastener components, each of said components having a thin, heat sealable plastic flange portion having a substantially flat undersurface for heat sealing engagement with the surface of an article and a snap fastener portion extending from the opposite surface thereof, each of said components being united to another in substantially edge to edge contact by a severable attaching portion of less width than said flange portions.

References Cited in the file of this patent

UNITED STATES PATENTS

| | | |
|---|---|---|
| 1,310,119 | Harper | July 15, 1919 |
| 2,132,296 | Hill | Oct. 4, 1938 |
| 2,379,934 | Seiferth | July 10, 1945 |
| 2,740,964 | Derby et al. | Apr. 10, 1956 |
| 2,851,756 | Jones | Sept. 16, 1958 |

FOREIGN PATENTS

| | | |
|---|---|---|
| 22,396 | Great Britain | of 1911 |
| 679,373 | Great Britain | Sept. 17, 1952 |